United States Patent
Majjigi et al.

(10) Patent No.: US 9,949,216 B2
(45) Date of Patent: Apr. 17, 2018

(54) POWER CONSUMPTION OPTIMIZATION FOR CELLULAR COMMUNICATION VIA POWER AMPLIFIER BIASING

(71) Applicant: Apple Inc., Cupertino, CA (US)

(72) Inventors: Vinay R. Majjigi, Sunnyvale, CA (US); Tarik Tabet, Los Gatos, CA (US); Christian W. Mucke, Cupertino, CA (US); William S. Burchill, San Jose, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 14/492,623

(22) Filed: Sep. 22, 2014

(65) Prior Publication Data

US 2015/0087351 A1 Mar. 26, 2015

Related U.S. Application Data (60) Provisional application No. 61/882,309, filed on Sep. 25, 2013.

(51) Int. Cl.
*H04W 52/26* (2009.01)
*H04W 52/52* (2009.01)
*H04L 1/00* (2006.01)

(52) U.S. Cl.
CPC ........... *H04W 52/52* (2013.01); *H04L 1/0003* (2013.01)

(58) Field of Classification Search
CPC ............................. H04W 52/26; H04W 52/52
See application file for complete search history.

(56) References Cited

U.S. PATENT DOCUMENTS

| | | | |
|---|---|---|---|
| 8,477,603 B2 | 7/2013 | Sambhwani et al. | |
| 2002/0154611 A1* | 10/2002 | Khullar | H04L 1/0003 370/329 |
| 2003/0153276 A1* | 8/2003 | Terry | H04L 1/0003 455/69 |
| 2004/0147235 A1* | 7/2004 | Jin | H03G 3/3042 455/127.1 |
| 2004/0203981 A1* | 10/2004 | Budka | H04W 52/265 455/522 |

(Continued)

*Primary Examiner* — Wesley Kim
*Assistant Examiner* — Dong-Chang Shiue
(74) *Attorney, Agent, or Firm* — Meyertons Hood Kivlin Kowert & Goetzel, P.C.; Jeffrey C. Hood (57) ABSTRACT

This disclosure relates to optimizing power consumption for cellular communication based on transport block size in combination with channel condition measurements via power amplifier biasing. According to one embodiment, an indication of a transport block size to be used for uplink communication with a base station may be received. It may be determined that the transport block size provides more robust communication characteristics than required for current channel conditions. A power amplifier (PA) bias current for uplink communication with the cellular base station may be selected based at least in part on determining that the transport block size provides more robust communication characteristics than required for the current channel conditions. In particular, PA bias current selection may be biased to reduce power consumption at a cost of greater non-linearity based on the transport block size providing more robust communication characteristics than required for the current channel conditions.

20 Claims, 6 Drawing Sheets

(56) References Cited

U.S. PATENT DOCUMENTS

| | | | |
|---|---|---|---|
| 2005/0208973 A1* | 9/2005 | Iochi | H04W 52/16 455/561 |
| 2009/0021303 A1* | 1/2009 | Vinayak | H03F 1/0238 330/127 |
| 2009/0040969 A1* | 2/2009 | Kim | H04W 28/06 370/328 |
| 2010/0128614 A1* | 5/2010 | Kuusela | H04L 12/5695 370/252 |
| 2010/0195614 A1* | 8/2010 | Nimbalker | H04W 72/1289 370/330 |
| 2011/0085508 A1* | 4/2011 | Wengerter | H04L 5/0094 370/329 |
| 2011/0164574 A1 | 7/2011 | Rao et al. | |
| 2012/0275438 A1 | 11/2012 | Dai | |
| 2013/0059546 A1* | 3/2013 | Lum | H04B 1/0475 455/73 |
| 2013/0077582 A1 | 3/2013 | Kim et al. | |
| 2013/0176864 A1* | 7/2013 | Quan | H04W 72/0473 370/245 |
| 2013/0187711 A1 | 7/2013 | Goedken et al. | |
| 2013/0329559 A1 | 12/2013 | Cabrera et al. | |
| 2015/0017933 A1* | 1/2015 | McCallister | H04B 1/0475 455/114.3 |

\* cited by examiner

| $I_{TBS}$ | $N_{PRB}$ | | | | |
|---|---|---|---|---|---|
| | 1 | 2 | 3 | 4 | 5 |
| 0 | 16 | 32 | 56 | 88 | 120 |
| 1 | 24 | 56 | 88 | 144 | 176 |
| 2 | 32 | 72 | 144 | 176 | 208 |
| 3 | 40 | 104 | 176 | 208 | 256 |
| 4 | 56 | 120 | 208 | 256 | 328 |
| 5 | 72 | 144 | 224 | 328 | 424 |
| 6 | 328 | 176 | 256 | 392 | 504 |
| 7 | 104 | 224 | 328 | 472 | 584 |
| 8 | 120 | 256 | 392 | 536 | 680 |
| 9 | 136 | 296 | 456 | 616 | 776 |
| 10 | 144 | 328 | 504 | 680 | 872 |
| 11 | 176 | 376 | 584 | 776 | 1000 |
| 12 | 208 | 440 | 680 | 904 | 1128 |
| 13 | 224 | 488 | 744 | 1000 | 1256 |
| 14 | 256 | 552 | 840 | 1128 | 1416 |
| 15 | 280 | 600 | 904 | 1224 | 1544 |
| 16 | 328 | 632 | 968 | 1288 | 1608 |
| 17 | 336 | 696 | 1064 | 1416 | 1800 |
| 18 | 376 | 776 | 1160 | 1544 | 1992 |
| 19 | 408 | 840 | 1288 | 1736 | 2152 |
| 21 | 440 | 904 | 1384 | 1864 | 2344 |
| 21 | 488 | 1000 | 1480 | 1992 | 2472 |
| 22 | 520 | 1064 | 1608 | 2152 | 2664 |
| 23 | 552 | 1128 | 1736 | 2280 | 2856 |
| 24 | 584 | 1192 | 1800 | 2408 | 2984 |
| 25 | 616 | 1256 | 1864 | 2536 | 3112 |
| 26 | 712 | 1480 | 2216 | 2984 | 3752 |

Annotations:
- VoIP Packet Fits Here → row 16, column 1 (328)
- TBS/MCS Supported After PA Bias Current Adjustment → row 19
- TBS/MCS Supported (with Current Status) → row 25

FIG. 7

POWER CONSUMPTION OPTIMIZATION FOR CELLULAR COMMUNICATION VIA POWER AMPLIFIER BIASING

PRIORITY CLAIM

The present application claims benefit of priority to U.S. Provisional Application No. 61/882,309 titled "Transport Block Size and Channel Condition Assessment Based Power Consumption Reduction for Cellular Communication" and filed on Sep. 25, 2013, whose inventors are Vinay R. Majjigi, Tarik Tabet, Christian W. Mucke, and William S. Burchill, which is hereby incorporated by reference in its entirety as though fully and completely set forth herein.

FIELD

The present disclosure relates to wireless devices, and more particularly to a system and method for improving communication efficiency in a cellular communication system.

DESCRIPTION OF THE RELATED ART

Wireless communication systems are rapidly growing in usage. Further, wireless communication technology has evolved from voice-only communications to also include the transmission of data, such as Internet and multimedia content. There now exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others.

Cellular communication technologies may be capable of providing a variety of services, and may be used by a variety of applications. Different applications utilizing cellular communication may have different characteristics. Cellular communication techniques which do not take into account the different application characteristics of the various applications utilizing cellular communication may be in danger of operating inefficiently. Accordingly, improvements in the field would be desirable.

SUMMARY

Embodiments are presented herein of, inter alia, methods for performing wireless communication in a manner that considers transport block size assignment and channel conditions to select power amplifier bias current for uplink communication in order to optimize power consumption, and of devices configured to implement the methods.

Many cellular communication technologies provide a wide range of possible modulation and coding schemes and possible resource allocations, which potentially provides a cellular network with a great deal of granularity in selecting transport block size for each wireless device in the cellular network. In order to select a most efficient transport block size from among these options given a wireless device's current channel conditions, a wireless device may generally perform an assessment of current channel conditions and report results of such an assessment to its serving base station.

In some instances, it may be the case that channel conditions would support modulation and coding schemes which provide more throughput than is actually needed for the application traffic between the cellular network and a given wireless device. For example, for a wireless device whose application traffic has small, fixed payloads (e.g., many voice applications or machine type communications), in good channel conditions a cellular link between the cellular network and the wireless device might be capable of supporting up to a transport block size with substantially higher packet size than required by the application(s) executing on the wireless device.

In such a case, a cellular base station may select a transport block size for a particular wireless device to use for uplink communications which, based on channel condition assessment results for the wireless device, provides more robust communication characteristics than required for current channel conditions. This transport block size may be selected for the wireless device based at least in part on application characteristics of an application performing uplink communication with the cellular base station over the cellular link; for example, the application might utilize a fixed (or approximately fixed) packet size, and the selected transport block size might support but not greatly exceed that fixed packet size.

The base station may indicate the selected transport block size, possibly along with an assigned uplink transmit power, to the wireless device, which the wireless device may subsequently use for uplink communication with the base station. However, because of the relative robustness of the modulation and coding scheme, given the channel conditions, the wireless device may be able to select a lower power amplifier bias current to use when amplifying uplink signals for transmission, albeit at a cost of introduction of greater non-linearity than if a higher bias current were used, to reduce power consumption at the wireless device. Because of the relative robustness of the modulation and coding scheme, it may still be expected that the base station will be able to receive and decode the uplink communications from the wireless device despite the results of the increased non-linearity (such as possible distortion and/or out-of-band or spurious emissions).

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices, laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, unicast/multicast/broadcast, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
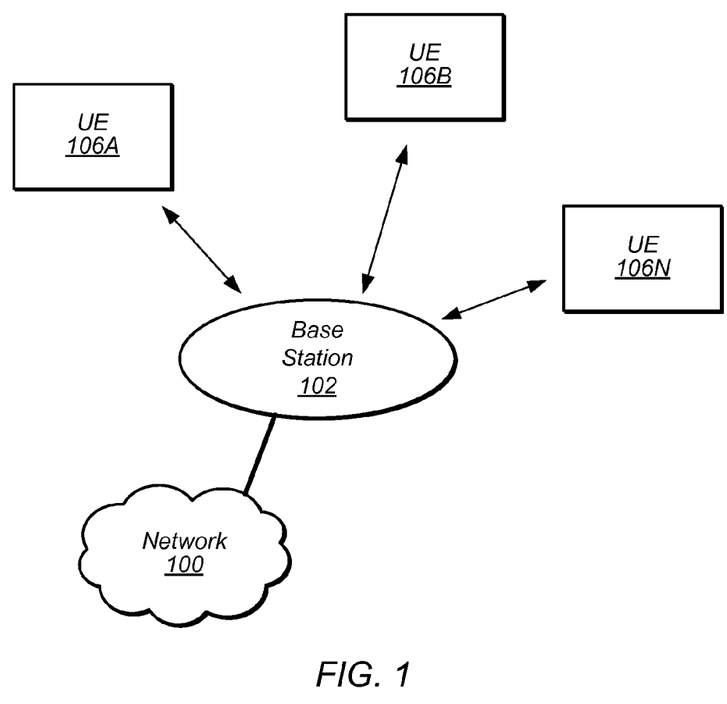
FIG. 1 illustrates an exemplary (and simplified) wireless communication system, according to one embodiment.
Figure 2:
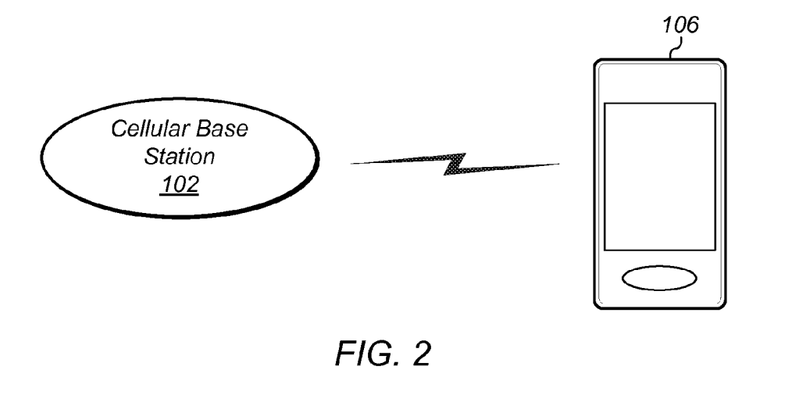
FIG. 2 illustrates a base station (BS) in communication with a user equipment (UE) device, according to one embodiment.

FIGS. 1-2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices are referred to as UEs or UE devices.

The base station 102 may be a base transceiver station (BTS) or cell site (a "cellular base station"), and may include hardware that enables wireless communication with UEs 106 according to one or more cellular communication protocols. The UE 106 and the cellular base station 102 may communicate using any of various cellular communication technologies such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice, SMS and/or data services.

A UE 106 may be capable of communicating using multiple wireless communication standards. For example, the UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102, according to one embodiment. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
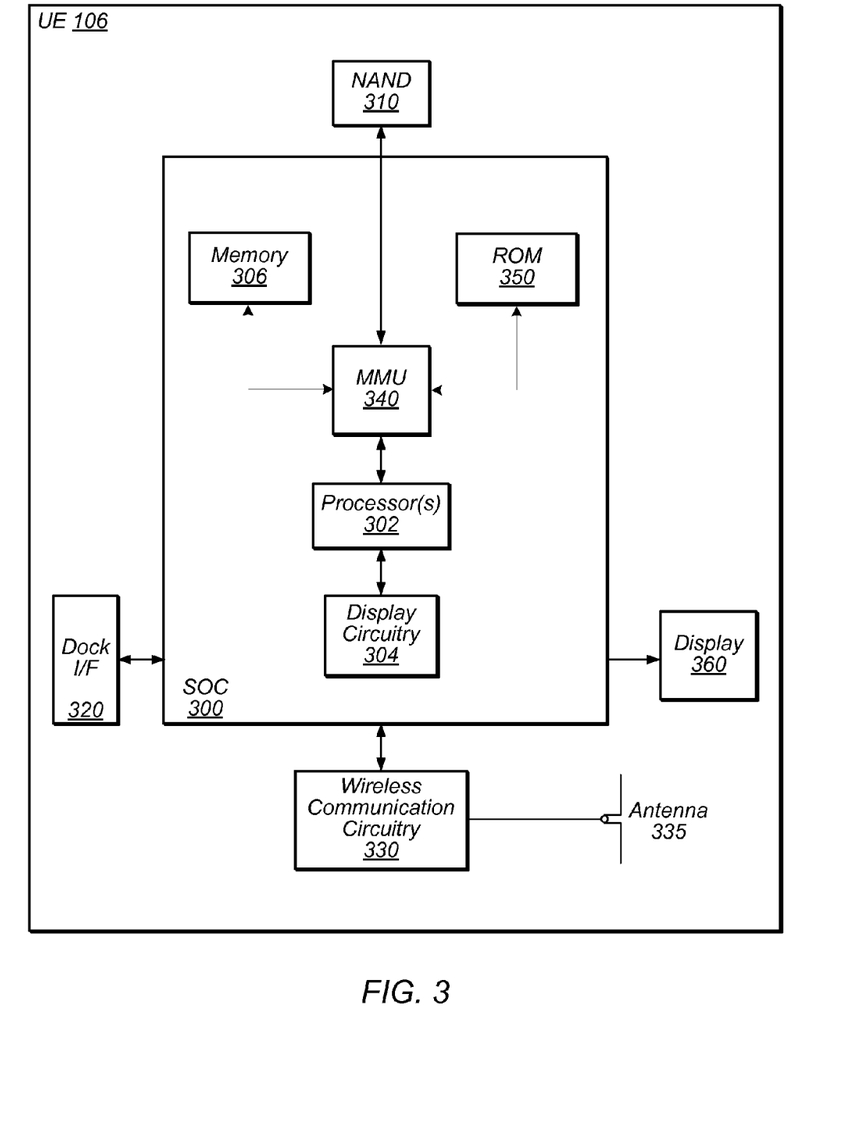
FIG. 3 illustrates an exemplary block diagram of a UE device, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
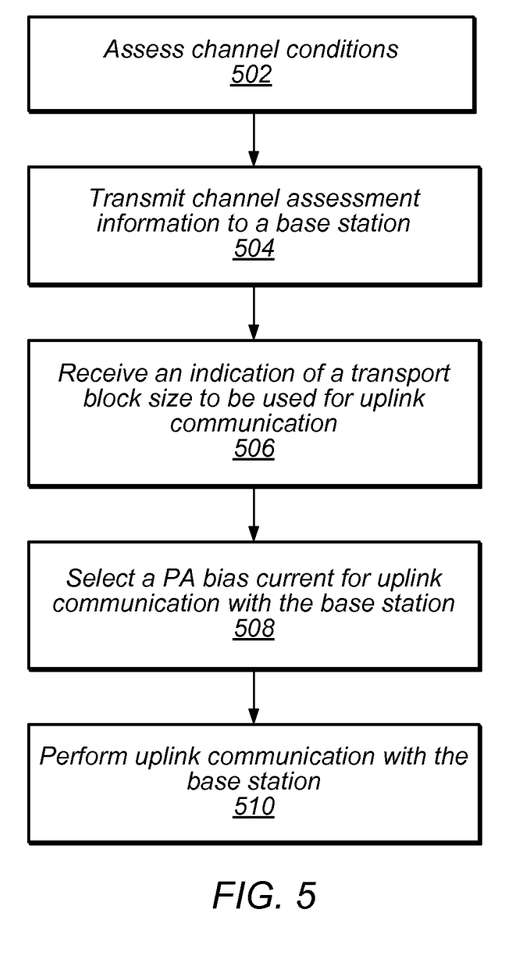
FIG. 5 is a flowchart diagram illustrating aspects of a technique for modifying PA bias current based on transport block size and channel conditions, according to one embodiment.

As described herein, the UE 106 may include hardware and software components for implementing features for reducing power consumption based on transport block size and channel conditions via power amplifier biasing, such as those described herein with reference to, inter alia, FIG. 5. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5.

Figure 4:
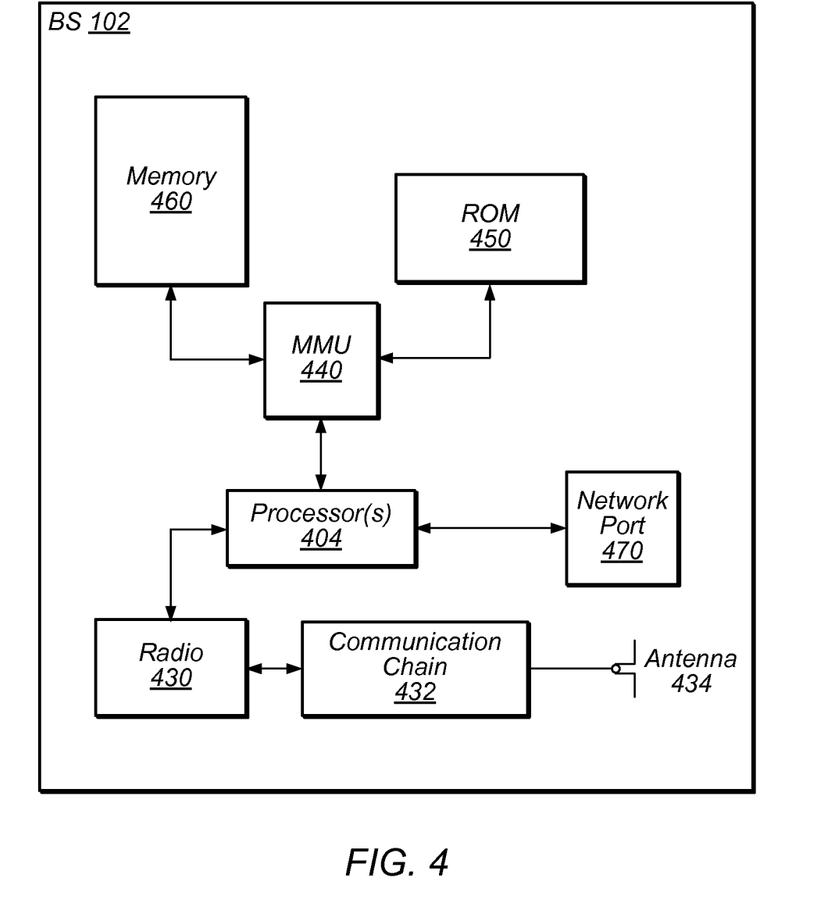
FIG. 4 illustrates an exemplary block diagram of a BS, according to one embodiment.

FIG. 4—Exemplary Block Diagram of a Base Station

FIG. 4 illustrates an exemplary block diagram of a cellular base station (BS) 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with respect to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, GSM, WCDMA, CDMA2000, Wi-Fi, etc.

The base station 102 may be configured to support power consumption efficient operation of a UE 106 in conjunction with cellular communication services. In particular, the BS 102 may include hardware and software components for implementing (or for use in conjunction with a UE 106 implementing) part or all of a method for a UE to reduce power consumption based on transport block size and channel conditions, such as the features described herein with reference to, inter alia, FIG. 5.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIG. 5—Flowchart

Cellular communication may be used by a variety of different applications. The characteristics of the various applications which may use cellular communication may differ greatly from one another. For example, some applications, such as high-definition real-time video chat or videoconferencing applications and certain gaming applications, may be relatively demanding with respect to bandwidth, latency, and other communication link characteristics. Other applications, such as bulk data transfers (e.g., file uploads/downloads), may be very flexible with respect to bandwidth demands/usage, and may not be particularly sensitive to link latency.

An increasingly important type of application which may utilize packet-switched cellular communication link may be the voice application. In particular, certain cellular technologies such as LTE and LTE-A are moving towards an all internet protocol (IP) infrastructure, in which voice over IP (VoIP) packet-switched communications are used for voice communications instead of circuit-switched communications.

Voice applications may use any of a variety of codecs for compressing and decompressing voice data, including AMR-NB 12.2 kbps, AMR-WB 12.65 kbps, and many others. Given a particular codec, a voice application may typically utilize fixed (or approximately fixed) sized packets which may be communicated at regular (or approximately regular) intervals. Compared to many other applications which utilize cellular communication links, voice applications packets may be relatively small, and considering typical maximum cellular link capacity, voice applications may be relatively undemanding of network resources.

As another example, certain machine type communication (MTC) may generally include periodic, low data rate communication. Such communication, which might be used by process control devices, automation devices, measurement/monitoring devices such as thermometers, barometers, hydrometers, electricity meters, seismometers, etc., among various possibilities, may in many cases be relatively undemanding of network resources.

Given the differing characteristics of different types of applications which may use cellular links, it may be desirable to perform cellular communication in a manner which considers and makes use of these differing application characteristics in a manner that improves (reduces) UE and/or network power consumption and/or improves network efficiency.

FIG. 5 is a flowchart diagram illustrating one such method. In particular, FIG. 5 illustrates an exemplary method for a UE to select a power amplifier (PA) bias current based on transport block size and current channel conditions, according to one embodiment. The method may be suitable for use when the transport block size is determined by the base station at least in part based on application characteristics of an application on the UE which is utilizing the cellular link. The method shown in FIG. 5 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 502, the UE may assess current channel conditions of a channel used for cellular communication with a base station. Any of a variety of channel assessment mechanisms may be used. As one example, the UE may perform a channel quality assessment in which a communication channel is monitored for a period of time, measurements are taken on one or more aspects of the communication channel (such as signal to noise ratio, among various possible measurements indicative of channel quality), and formulated into a format expected by the BS. One such example of a channel quality assessment report may be a channel quality indicator (CQI) report.

In some embodiments, the UE may be able to determine what modulation and coding schemes would be supported by the current channel conditions based on its channel condition assessment. For example, the UE may be able to determine that any MCS up to a maximum MCS would be supported by current channel conditions. As one possibility, the UE may determine that the maximum MCS supported is an MCS with an MCS index value corresponding to a CQI value determined as part of the channel condition assessment.

As another possibility, the UE may track the number of hybrid automatic repeat request (HARM) retransmissions that are requested by the base station as an indicator of current channel conditions. For example, fewer retransmissions requested as a percentage of first transmissions may be indicative of better uplink channel conditions, while a greater number of retransmissions requested as a percentage of first transmissions may be indicative of worse uplink channel conditions. Such a measure of current channel conditions may be used to determine a maximum MCS supported by current channel conditions, or more directly as an indication of the presence or absence of excess robustness of an allocated MCS with respect to current channel conditions (e.g., as described further below herein), as desired.

In 504, channel assessment information may be transmitted to the base station from the UE. As noted above, the channel assessment information may be indicative of current channel condition quality. As one example, the channel assessment information may include one or more channel quality indicator (CQI) measurements taken by the UE. As another example, the channel assessment information may include reference signals transmitted by the UE, which may be used by the BS to assess the uplink channel of the UE. Any of various other forms of channel assessment information are also possible.

In 506, an indication of a transport block size (TBS) to be used for uplink communication with the BS may be received by the UE. Selection of the transport block size by the BS may include selecting a number of physical resource blocks to assign the UE, and selecting a modulation and coding scheme for the UE to utilize for uplink communication. The transport block size may be selected based at least in part on current channel conditions (e.g., as indicated by the channel assessment information), and may further be based at least in part on the application traffic characteristics of the application on the UE performing uplink communications with the cellular base station. For example, as one possibility, the transport block size may be selected based at least in part on average packet size for the application if packet size variance for application traffic is below a packet size variance threshold.

For example, the BS may determine application characteristics of an application on the UE performing uplink communications with the cellular base station. The application characteristics determined may include any of a variety of application traffic characteristics; for example, the application characteristics might include one or more of typical transmission and/or reception frequency and/or regularity, typical packet size, and/or degree of packet size variation.

In some cases, application characteristics may be monitored/measured by the BS over a period of time, and thus may be determined based on the previous (uplink and/or downlink) traffic pattern(s) of the UE. Alternatively, or in addition, application characteristics may in some cases be inferred from an application type of the application and/or a Quality of Service (QoS) Class Indicator (QCI) associated with an application. For example, it may be determined that the application is a voice (e.g., VoIP) application (e.g., for which QCI=1), and may thus be determined to have certain characteristics based on being a voice application. Determinations of (e.g., similar or different) application characteristics might likewise be made based on other application types (e.g., video chat applications, gaming applications, email and/or other productivity applications, streaming video applications, MTC applications, etc.) and/or QCI values.

In certain cases (e.g., depending on the application characteristics), the transport block size selected may be formed on the basis of a modulation and coding scheme which is more robust than required for current channel conditions (e.g., as understood by the base station based on the channel assessment information). For example, in some instances an application may utilize a fixed packet size (or possibly nearly fixed, such as an average packet size with packet size variance below a packet size variance threshold) for uplink communication. In such a scenario, the BS may select a transport size which includes the lowest order MCS which supports the fixed packet size. In this case, if current channel conditions would also support one or more higher order MCS than the selected MCS, the selected MCS may be more robust MCS than required by the current channel conditions, while also providing a sufficiently large transport block size to accommodate the application packets. For example, a voice application or a MTC application might have suitable application characteristics for such a scenario to occur, and might accordingly be assigned a transport block size which provides more robust communication characteristics than required for current channel conditions. As one specific possibility, the selected MCS may be the most robust MCS which, in combination with the selected physical resource block allocation, provides sufficient transport block size to accommodate application packets of the application.

In addition to the indication of the TBS allocation, at least in some instances the UE may also receive an indication of an transmit power to be used for uplink communication with the base station. The base station may select the uplink transmit power based on network load and interference conditions, channel conditions, specification requirements of a cellular communication standard according to which the base station and the UE operate, regulation considerations (e.g., FCC requirements, such as relating to specific absorption ratio (SAR) requirements), and/or any of various other considerations.

Power amplification of uplink signals may be used to achieve a target transmit power (e.g., the uplink transmit power indicated by the base station), and may be achieved by way of one or more power amplifiers (including one or more single-stage PAs and/or one or more multi-stage PAs). Some or all of the amplification stages may be capable of operation at any of multiple bias currents. Accordingly, In 510, PA bias current(s) for the UE to use for its uplink communication with the base station may be selected.

Selection of the PA bias current(s) may be based at least in part on the transport block size selected, and may also be based on the channel assessment information. For example, if the selected transport block size does provide more robust communication characteristics than required for current channel conditions, selection of the PA bias current may be biased towards reduced power consumption (e.g., at a cost of greater non-linearity).

Selecting a lower bias current to achieve a transmit power specified by the BS may result in a less linear (more non-linear) response from the PA, which may in turn result in a more distorted signal and/or more out-of-band and/or spurious emissions, but may reduce power consumption by the UE. Since in this example the current channel conditions may be relatively good in consideration of the selected transport block size, the negative effects of utilizing a more non-linear portion of the PA response profile may not have a significantly negative effect on the BS's ability to successfully receive and decode the uplink communications by the UE. In other words, reducing PA bias current in such a case may benefit the UE by reducing its power consumption, without negatively affecting the likelihood of success of communications made using the reduced PA bias current.

For example, as one possibility, selection of the PA bias current may include selecting a PA bias current which minimizes power consumption for the target transmission power subject to one or more limits to non-linearity, such as a signal distortion limit or an out-of-band and/or spurious emission limit. If the current channel conditions would support a higher MCS than the MCS assigned for uplink communication as part of the TBS, the non-linearity limit(s) may be relaxed (e.g., increased), which may result in selection of lower bias current at one or more PA stages than would occur for lower (e.g., normal) non-linearity limit(s). A signal distortion limit and/or an out-of-band/spurious emission limit might be increased, for example, based on a difference between the maximum MCS supported by current channel conditions and the actual MCS assigned for uplink communication. In other words, if desired, a degree to which selection of the PA bias current is biased towards reduced power consumption at a cost of greater non-linearity may depend on a degree of difference between the maximum MCS supported by the current channel conditions and the assigned MCS.

As noted above, the PA bias current selection process may relate to a single stage PA or a multi-staged PA (e.g., where there are multiple amplification stages). In the case of a multi-stage PA, bias current selection may be performed on a per-stage basis. This may in turn enable an overall optimization of the PA bias current(s), such that one, some, or all amplification stages of a PA might have a reduced bias current and increased non-linearity as a result of the selection process being biased based on the transport block size/channel condition assessment. In this manner, it may be possible to reduce the overall power consumption as much as possible while limiting the introduced non-linearity to such a degree that a BS may still be expected to be able to decode uplink transmissions.

Note further that the degree to which bias current selection may be biased towards a lower bias current may depend on the degree of difference between the MCS selected as part of TBS selection and the maximum MCS that would be supported by current channel conditions. For example, if the maximum MCS index supported by current channel conditions were 25 and the MCS index selected as part of TBS selection were 16, a stronger bias towards reduced bias current might be induced than if the maximum MCS index supported by current channel conditions were 20.

In 510, uplink communication with the base station may be performed. The uplink communication may be performed according to the indicated transport block size and transmit power, and according to the PA bias current selected as described in step 508.

Note that the method of FIG. 5 may be repeated any number of times (e.g., may be part of a recurring control loop), if desired.

Figure 6:
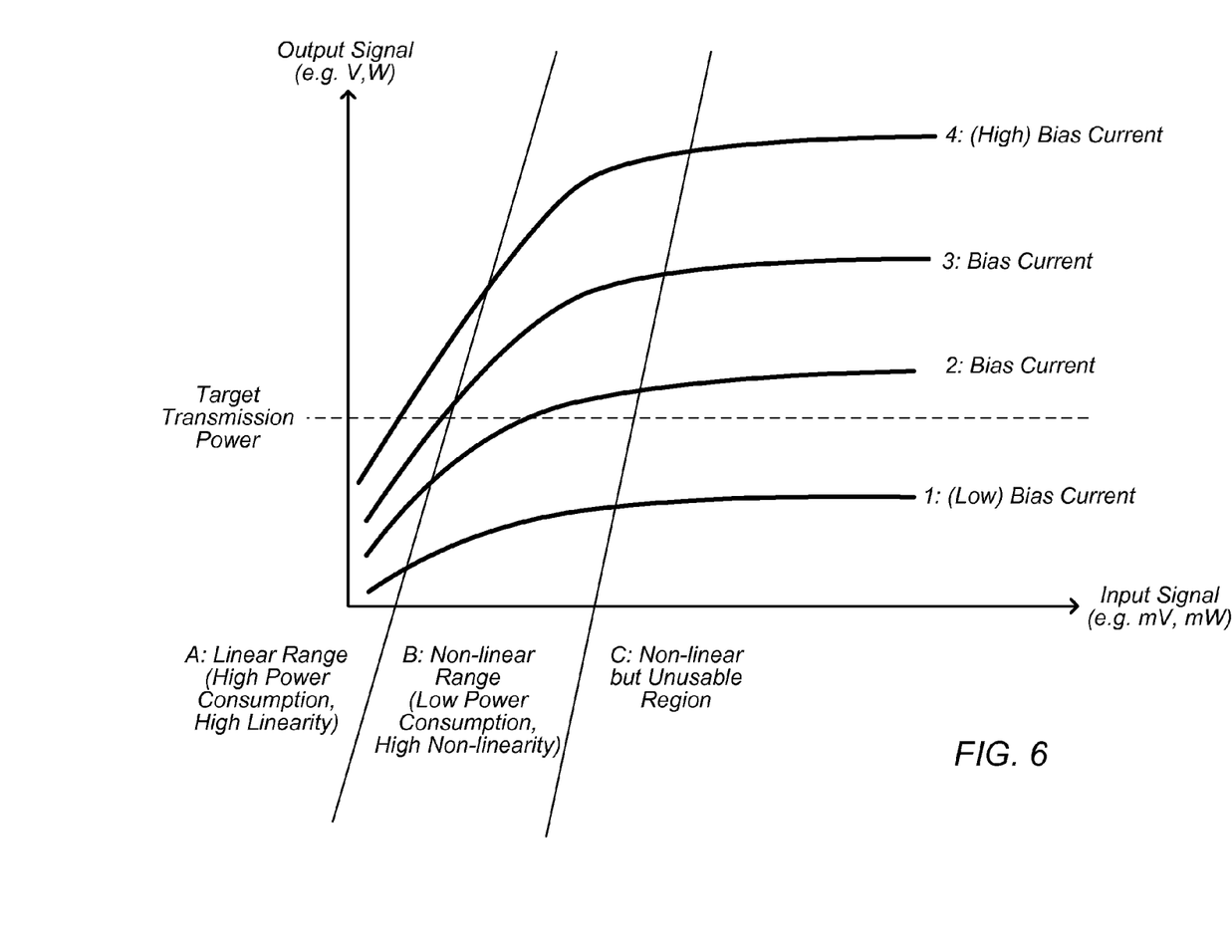
FIG. 6 illustrates an exemplary input/output profile of a power amplifier which might be used in conjunction with cellular uplink communication by a UE, according to one embodiment.
Figure 7:
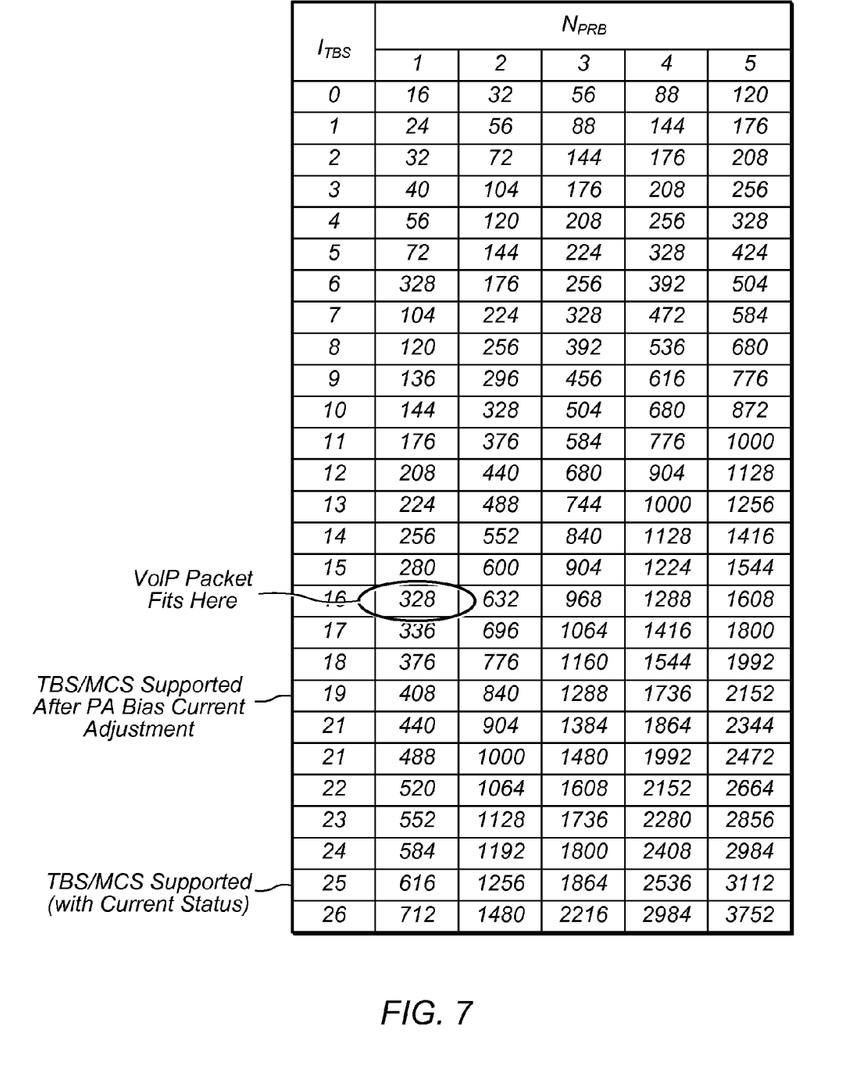
FIG. 7 is a table illustrating an exemplary transport block size table which may be used in conjunction with cellular communication, according to one embodiment.

FIGS. 6-7

FIG. 6 illustrates an exemplary input/output profile of power amplifier which might be used in conjunction with cellular uplink communication by a UE, such as might be used in conjunction with the method of FIG. 5, according to one embodiment. FIG. 7 illustrates an exemplary TBS table which may be used in conjunction with cellular communication systems, including such systems in which the method illustrated in and described with respect to FIG. 5 might be implemented, according to one embodiment. Note that while FIGS. 6-7 and the corresponding description thereof are provided for illustrative purposes, this information is provided by way of example only, and is not intended to be limiting to the disclosure as a whole.

As shown in FIG. 6, a power amplifier (PA) may receive an input signal, amplify the signal, and output an output signal. The output signal may be stronger (i.e., higher powered) than the input signal. For example, as shown, an input signal on the order of mV/mW might be amplified such that the output signal is on the order of V/W. Other orders of amplitude are also possible.

As also shown, it may be possible to operate a PA at any of multiple possible bias currents. For example, four different bias current levels are illustrated in FIG. 6. It should be noted, however, that any number of bias current levels (e.g., numbers greater or lesser than four) may be used if desired. Each of the various bias currents may result in a different input/output power profile. For any given input signal, a lower bias current may produce a lesser degree of amplification than a higher bias current. In general, operating a PA at a lower bias current may require lower power consumption than operating a PA at a higher bias current.

In addition, for each possible bias current, a PA may have different operating ranges: in the lower operating range of a PA, the response profile of the PA may be substantially linear, while as the operating range of the PA increases, so may the non-linearity of the PA's response profile. As shown, the non-linear portion of the operating range may in some cases be differentiated into two portions, of which one (e.g., the mid range) may be considered usable (although it may nonetheless be subject to greater distortion and out-of-band and/or spurious emissions than the linear portion of the operating range), and one (e.g., the highest range) may typically be considered unusable, though it should be noted that this determination may be made differently according to different implementations.

As illustrated in FIG. 6, for certain transmission power targets, it may be possible to use any of multiple possible bias currents (e.g., in combination with different input signal power levels) to achieve those transmission power targets. For example, it can be seen that any of bias currents 2, 3, or 4 could be used to achieve an output signal at the "Target Transmission Power" illustrated in FIG. 6. In general, in such cases, using a lower bias current to achieve the target transmission power will consume less power than a higher bias current; however, using a higher bias current may have less distortion than using a lower bias current, particularly if using the lower bias current would result in the PA operating in a substantially more non-linear operating range than the higher bias current.

Thus, generally, a bias value may be chosen to minimize power consumption for a specific target transmission power, subject to a number of constraints, such as (but not limited to) limiting the distortion of the transmitted signal, and limiting out-of-band and spurious emissions. In other words, one or more types of limits to non-linearity introduced by the PA may be used as part of PA bias current selection.

In the case in which the TBS selected for uplink transmission provides more robust communication characteristics than required for current channel conditions, such as described with respect to the method of FIG. 5, however, it may be desirable to modify or bias the selection criteria to account for the "robustness headroom" provided by the TBS allocation. For example, the distortion and/or the out-of-band and spurious emission limits may be relaxed (increased) depending on the degree to which the TBS selected for uplink transmission provides more robust communication characteristics than required for current channel conditions.

The table illustrated in FIG. 7 may be used to illustrate such an exemplary scenario in which PA bias current selection might be biased based on having more robust TBS than required for a particular set of channel conditions.

As shown, the table illustrated in FIG. 7 indicates transport block sizes resulting from various combinations of TBS indices (which may be correlated or identical to MCS indices) and numbers of physical resource blocks assigned to a UE. As shown, the transport block sizes may generally increase with both TBS index ($I_{TBS}$) and with number of PRBs assigned ($N_{PRB}$).

Consider a scenario in which a voice (e.g., VoIP) application typically utilizes packets which comfortably fit in an $I_{TBS}$ of 16 in a single PRB. Now, consider that current channel conditions would support an $I_{TBS}$ of 25. In this case, if a base station assigns (e.g., based on application characteristics of the voice application and/or based on the application type being a voice application) the $I_{TBS}$ of 16 and a single PRB, the communication characteristics provided may be more robust than required for the actual channel conditions.

Given this 'headroom' in the robustness of the TBS assigned to the UE, the UE may (e.g., in accordance with the method of FIG. 5) determine to reduce the PA bias current used in conjunction with the assigned TBS. For example, the BS might select its PA bias current in a manner that effectively reduces this 'headroom' by selecting a bias current which will produce a slightly more distorted signal but will require less power consumption by the UE. Note that at least in some cases, the bias current selection process may be configured to leave some robustness headroom; for example, as shown, the bias current might be modified such that the signal transmitted by the UE to the BS, given the current channel conditions, would still support an $I_{TBS}$ of 19. If desired, greater or lesser bias current selection adjustments (e.g., resulting in greater or lesser robustness headroom) may also be used.

Control Loop

Many cellular communication systems utilize a control loop. For example, the method illustrated in and described with respect to FIG. 5 might be implemented in a cellular communication system in which a control loop is used. The following description provides certain exemplary details of one such control loop which might be used in conjunction with the method of FIG. 5. Note that while the following information is provided for illustrative purposes of certain exemplary details which may be used in some implementations, this information is provided by way of example only, and is not intended to be limiting to the disclosure as a whole.

In a control loop between a UE and a BS, a UE may gather certain information (such as information relating to downlink channel conditions) and transmit that information to the base station. The UE may also transmit reference signals to the base station to enable the base station to gather information relating to uplink channel conditions. The base station may consider that information and, in combination and coordination with various other network elements (e.g., other UEs in the system) and considerations, indicate to the UE certain characteristics which the UE should use for its communications back to the base station for a subsequent period of time.

As noted above, among the information gathered by the UE may be information relating to channel conditions. For example, the UE may perform a channel quality assessment in which a communication channel is monitored for a period of time, measurements are taken on one or more aspects of the communication channel (such as signal to noise ratio, among various possible measurements indicative of channel quality), and formulated into a format expected by the BS. One such example of a channel quality assessment report may be a channel quality indicator (CQI) report. Likewise, in some instances the UE may transmit reference signals, based on which the base station may determine the uplink channel quality for the UE. One example of such reference signals may include Sounding Reference Signals (SRS) according to LTE.

Among the characteristics of uplink communication to be used by a UE which a BS may determine based on information (such as SRS or CQI reports) provided by the UE may be a modulation and coding scheme (MCS). Higher order MCSs may provide greater throughput, but each incremental higher MCS may require incrementally better channel conditions to support the MCS without resulting in excessive error rates and packet losses. Said another way, each possible MCS may have a different robustness, and so each may be suitable only for a certain range of channel condition quality.

Thus, MCS selection may be at least partially dependent on channel conditions. For example, if a given MCS is used in worse channel conditions than it is suited for, it may result in excessive packet loss and thus inefficient and possibly ineffective communication. Accordingly, except when channel conditions are sufficiently good that all configurable MCS schemes (e.g., as defined according to a given cellular standard) would be suitable, only a (e.g., lower order/more robust) subset of possible MCSs may effectively be available to choose from at any given time. In many cases, a channel assessment may result in a value which may be mapped to a specific MCS index value by the BS. That MCS index may represent the maximum (highest order/highest throughput) suitable MCS for the channel conditions represented by that value.

Another characteristic of UE uplink communication which a BS may determine may include a physical resource block (PRB) assignment. This may correspond to the amount of network resources (e.g., amount of channel bandwidth) allotted to a UE for a given uplink communication. Thus, a greater number of PRBs assigned to a UE may correspond to a greater throughput capacity being provided to the UE. Taken together, the number of PRBs and the MCS assigned to a UE may define its transport block size (TBS), or the maximum amount of data that may be communicated in a given transport interval.

A further characteristic of UE uplink communication which a BS may determine may include a transmit power to be used by the UE for uplink communications. The transmit power selected may be determined in any of a variety of ways according to different cellular communication standards, and may further differ within a cellular communication standard according to various scenarios. As one example, in LTE, UE transmit power may be calculated by a base station differently depending on whether the physical uplink shared channel (PUSCH) is being used with or without simultaneous physical uplink control channel (PUCCH) use.

Once the various characteristics of UE uplink communication have been determined, the BS may indicate these characteristics to the UE (e.g., by way of a downlink communication, typically on a control channel). The UE may then formulate and execute subsequent uplink communication with the UE according to the indicated characteristics.

The UE and the BS may repeat execution of such a control loop over the course of time during which they are in communication, in order to adjust communication characteristics to meet changing conditions (e.g., application traffic, channel conditions, network saturation, etc.).

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, comprising:
a radio; and
a processing element operably coupled to the radio;
wherein the radio and the processing element are configured to:
receive an indication of a transport block size to be used for uplink communication with a cellular base station;
determine a target transmission power for the uplink communication with the cellular base station;
determine that the transport block size provides more robust communication characteristics than required for current channel conditions;
select a power amplifier (PA) bias current from a plurality of PA bias currents available at the target transmission power for the uplink communication with the cellular base station in response to determining that the transport block size provides more robust communication characteristics than required for current channel conditions, wherein the selected PA bias current corresponds to a more non-linear portion of a PA response profile, and wherein use of the selected PA bias current during the uplink communication reduces power consumption during the uplink communication; and
perform the uplink communication with the cellular base station at the target transmission power using the selected PA bias current.

2. The UE of claim 1,
wherein the radio and the processing element are configured to select the PA bias current to minimize power consumption for a target transmission power subject to one or more of a signal distortion limit and an out-of-band emission limit,
wherein selection of the PA bias current includes increasing one or more of the distortion limit and/or the out-of-band emission limit.

3. The UE of claim 1, wherein the radio and the processing element are further configured to:
select PA bias current for uplink communication with the cellular base station for each stage of a multi-stage PA based at least in part on determining that the transport block size provides more robust communication characteristics than required for current channel conditions.

4. The UE of claim 1,
wherein the transport block size comprises a modulation and coding scheme (MCS) and a physical resource block (PRB) allocation for the UE to use for uplink communication with the cellular base station.

5. The UE of claim 4, wherein the radio and the processing element are further configured to:
assess current channel conditions to determine a maximum MCS supported by the current channel conditions,
wherein a degree to which selection of the PA bias current is biased depends on a degree of difference between the maximum MCS supported by the current channel conditions and the MCS of the transport block size indicated to be used for uplink communication with the cellular base station.

6. The UE of claim 4,
wherein the transport block size is selected based at least in part on application characteristics of an application on the UE performing uplink communication with the cellular base station,
wherein the MCS is a most robust MCS which, in combination with the PRB allocation, provides sufficient transport block size to accommodate application packets of the application.

7. The UE of claim 1, wherein the radio and the processing element are further configured to:
receive an indication of a transmit power to be used for uplink communication with the cellular base station,
wherein selecting the PA bias current for uplink communication with the cellular base station is also based at least in part on the indication of the transmit power to be used for uplink communication with the cellular base station.

8. A method for a wireless user equipment (UE) device to reduce power consumption during cellular uplink communications, the method comprising:
receiving an indication of a specified order modulation and coding scheme (MCS) to be used for uplink communication of the UE with a cellular base station;
determining a target transmission power for the uplink communication with the cellular base station;
assessing current channel conditions of a wireless communication channel used for wireless communication between the UE and the cellular base station;
determining a highest order MCS supported by the current channel conditions, based on the assessing of current channel conditions, wherein the highest order MCS is of a higher order than the specified order MCS;
selecting a power amplifier (PA) bias current from a plurality of PA bias currents available at the target transmission power for the uplink communication with the cellular base station based at least in part on a difference between the highest order MCS and the specified order MCS, wherein the selected PA bias current corresponds to a more non-linear portion of a PA response profile; and
performing the uplink communication with the cellular base station at the target transmission power using the selected PA bias current.

9. The method of claim 8,
wherein selecting the PA bias current comprises selecting a PA bias current value which minimizes power consumption for a target transmission power subject to a signal distortion limit and an out-of-band and spurious emission limit,
wherein one or more of the distortion limit or the out-of-band and spurious emission limit depends on the difference between the specified order MCS and the highest order MCS.

10. The method of claim 9,
wherein one or more of the distortion limit or the out-of-band and spurious emission limit increases as the difference between the highest order MCS and the specified order MCS increases.

11. The method of claim 8,
wherein selecting a PA bias current for uplink communication with the cellular base station based at least in part on a difference between the highest order MCS and the specified order MCS reduces power consumption when the specified order MCS provides more robust communication characteristics than required for the current channel conditions.

12. The method of claim 8,
wherein assessing current channel conditions comprises determining a channel quality indicator (CQI) value,
wherein the determining of a highest order MCS supported by the current channel conditions comprises determining an MCS index value corresponding to the determined CQI value.

13. The method of claim 8,
wherein the specified order MCS is selected based at least in part on application traffic characteristics of an application on the UE performing uplink communication with the cellular base station.

14. The method of claim 13,
wherein the application traffic characteristics comprise use of a fixed packet size or an average packet size having a packet size variance less than a packet size variance threshold.

15. A non-transitory computer accessible memory medium comprising program instructions for a wireless user equipment (UE) device to reduce power consumption during cellular uplink communications, wherein when executed, the program instructions cause the UE to:
receive an indication of a transport block size to be used for uplink communication with a cellular base station, wherein the transport block size is based on an assigned modulation and coding scheme (MCS) and a physical resource block (PRB) assignment;
determine a target transmission power for the uplink communication with the cellular base station;
assess current wireless channel conditions between the UE and the cellular base station to determine a highest order MCS supported by the current wireless channel conditions;
select a power amplifier (PA) bias current from a plurality of PA bias currents available at the target transmission power for the uplink communication with the cellular base station, wherein the selected PA bias current corresponds to a more non-linear portion of a PA response profile, and wherein, when the assigned MCS provides more robust communication characteristics than the highest order MCS for the current wireless channel conditions, use of the selected PA bias current during the uplink communication reduces power consumption during the uplink communication; and
perform the uplink communication with the cellular base station at the target transmission power using the selected PA bias current.

16. The memory medium of claim 15,
wherein PA bias current is selected to minimize power consumption for a target transmission power subject to a non-linearity limit,
wherein, when the assigned MCS provides more robust communication characteristics than the highest order MCS, the non-linearity limit is increased.

17. The memory medium of claim 16,
wherein a degree to which the non-linearity limit is increased depends on a degree of difference between the highest order MCS and the assigned MCS.

18. The memory medium of claim 15,
wherein selecting PA bias current for uplink communication with the cellular base station comprises selecting a PA bias current value for a single stage PA.

19. The memory medium of claim 15,
wherein selecting PA bias current for uplink communication with the cellular base station comprises selecting PA bias current values for each stage of a multi-stage PA.

20. The memory medium of claim 15, wherein when executed, the program instructions further cause the UE to:
receive the indication of a transport block size to be used for uplink communication, assess the current wireless channel conditions between the UE and the cellular base station to determine a highest order MCS supported by the current wireless channel conditions, and select the PA bias current for uplink communication with the cellular base station all in a repeating manner as part of a recurring cellular communication control loop.

* * * * *